United States Patent
Kani et al.

(10) Patent No.: US 8,272,454 B2
(45) Date of Patent: Sep. 25, 2012

(54) CUTTING UNITS AND DRIVE SYSTEMS USED FOR CUTTING DEVICES

(75) Inventors: Toshiyuki Kani, Anjo (JP); Masahiko Miura, Anjo (JP)

(73) Assignee: Makita Corporation, Anjo (JP)

( * ) Notice: Subject to any disclaimer, the term of this patent is extended or adjusted under 35 U.S.C. 154(b) by 423 days.

(21) Appl. No.: 12/591,306

(22) Filed: Nov. 16, 2009

(65) Prior Publication Data

US 2010/0122619 A1    May 20, 2010

(30) Foreign Application Priority Data

Nov. 20, 2008    (JP) .................................. 2008-296776

(51) Int. Cl.
    *B23D 45/04*    (2006.01)
(52) U.S. Cl. ....... 173/216; 173/213; 173/217; 83/471.3; 83/490
(58) Field of Classification Search .................. 173/216, 173/217, 213; 83/471.3, 490, 522.11; 451/358
    See application file for complete search history.

(56) References Cited

U.S. PATENT DOCUMENTS

| 1,480,263 | A | | 1/1924 | Hoffman |
| 5,425,294 | A | * | 6/1995 | Ushiwata et al. ............ 83/471.3 |
| 5,974,927 | A | * | 11/1999 | Tsune ............................. 83/490 |
| 6,532,853 | B1 | * | 3/2003 | Kakimoto et al. ......... 83/698.11 |
| 6,863,135 | B2 | * | 3/2005 | Kamimura et al. ........... 173/216 |
| 7,252,027 | B2 | * | 8/2007 | Meredith et al. ............. 83/471.3 |
| 7,357,195 | B2 | * | 4/2008 | Kamimura et al. ........... 173/216 |
| 2002/0152867 | A1 | | 10/2002 | Meredith et al. |
| 2005/0224245 | A1 | | 10/2005 | Kamimura et al. |

FOREIGN PATENT DOCUMENTS

| CN | 2691758 Y | 4/2005 |
| GB | 138222 | 2/1920 |

OTHER PUBLICATIONS

Mar. 31, 2010 Search Report issued in European Patent Application No. 09 01 4383.
Chinese Office Action dated Sep. 15, 2011 issued in Chinese Patent Application No. 200910209475.0 (with translation).

\* cited by examiner

*Primary Examiner* — Scott A. Smith
(74) *Attorney, Agent, or Firm* — Oliff & Berridge, PLC

(57) ABSTRACT

One aspect according to the present invention includes a cutting unit for a cutting device. The cutting unit has a gear chamber. A partitioning member can partition the gear chamber at a midpoint of a transmission path of rotation of a gear train from an electric motor to a spindle.

16 Claims, 5 Drawing Sheets

CUTTING UNITS AND DRIVE SYSTEMS USED FOR CUTTING DEVICES

This application claims priority to Japanese patent application serial number 2008-296776, the contents of which are incorporated herein by reference.

BACKGROUND OF THE INVENTION

1. Field of the Invention

The present invention relates to cutting units of cutting devices, such as table cutting devices and portable cutting devices, and also relates to drive systems used for the cutting devices.

2. Description of the Related Art

In general, a table cutting device includes a table for accommodating a workpiece, and a cutting unit vertically movably supported on the table, so that the workpiece can be cut as the rotary cutting blade cuts into the workpiece by the downward movement of the cutting unit.

A portable cutting device includes a base for placing on a workpiece, and a cutting unit supported on an upper side of the base. The cutting unit has a rotary cutting blade having a lower portion protruding downward from the base, so that the rotary cutting blade can cut the workpiece as the base and the cutting unit move together along the upper surface of the workpiece.

According to both of the table cutting device and the portable cutting device, the cutting unit includes an electric motor serving as a drive source for driving the rotary cutting blade, and a reduction gear train for reducing the rotational speed of the electric motor. As a known art relating to a technique of driving the rotary cutting blade by the electric motor, U.S. Patent Publication No. 2002/0152867 teaches to increase a distance between a spindle having a circular cutting blade mounted thereon and a motor shaft of an electric motor by reducing the rotational speed of the electric motor in plural stages by a reduction gear train. This arrangement enables to increase a maximum cutting depth achieved by the cutting blade and to set a large inclination angle of a cutting unit during an inclined cutting operation with the cutting unit inclined laterally from a vertical position.

However, the technique of the above U.S. patent involves a problem that the gear chamber must have a large vertical length to cause insufficient lubrication of an upper region of a gear chamber accommodating the gear train, because lubrication oil sealingly contained within the gear chamber may flow downward within the gear chamber.

Therefore, there is a need in the art for a cutting unit capable of improving lubrication within the gear chamber.

SUMMARY OF THE INVENTION

One aspect according to the present invention includes a cutting unit for a cutting device, which includes a partitioning member that can partition a gear chamber at a midpoint of a transmission path of rotation of a gear train from an electric motor to a spindle.

DETAILED DESCRIPTION OF THE INVENTION

Figure 1:
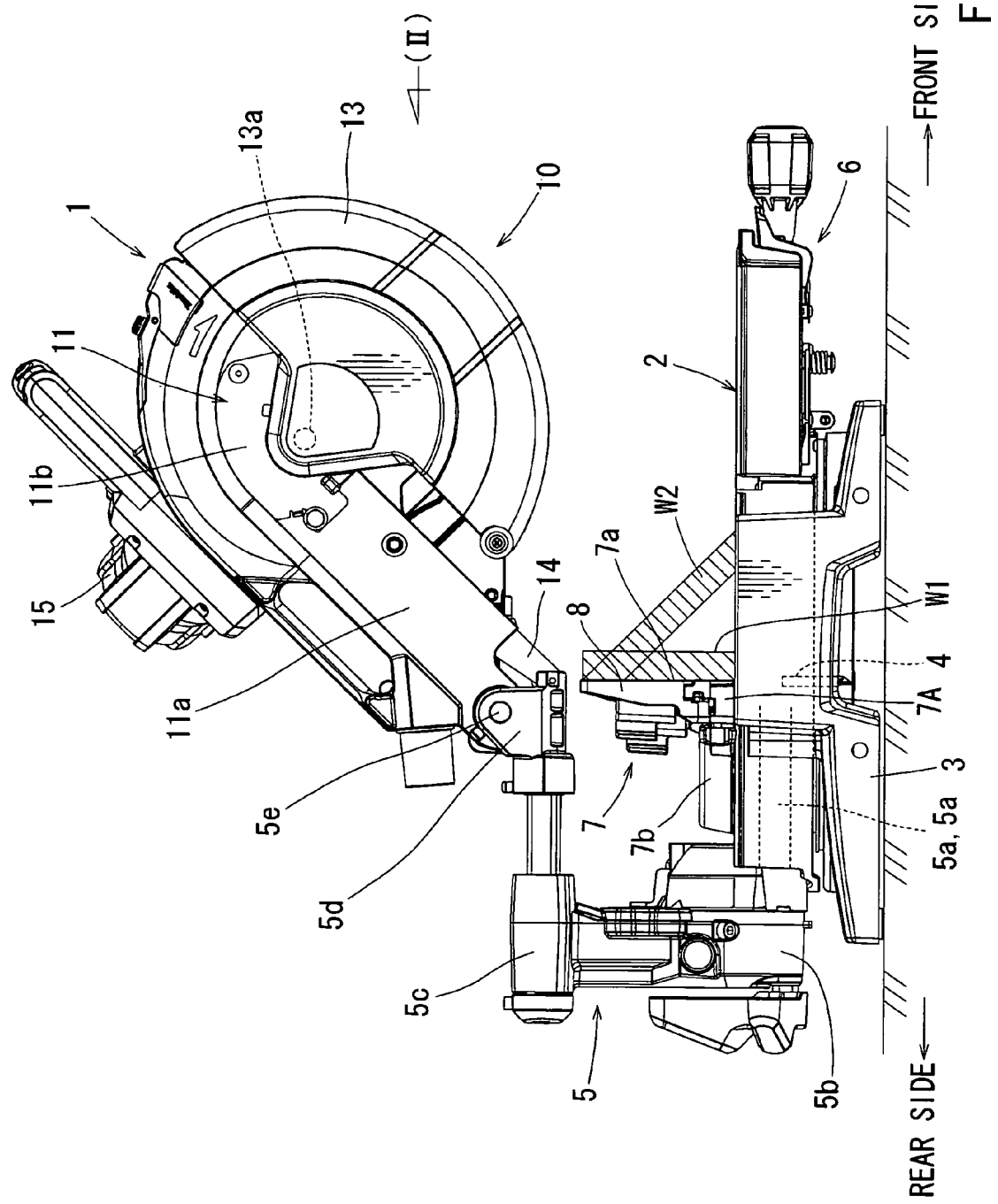
FIG. 1 is a side view of a table cutting device according to an embodiment of the present invention.

Each of the additional features and teachings disclosed above and below may be utilized separately or in conjunction with other features and teachings to provide improved cutting units and drive systems for cutting devices. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

In one embodiment, a cutting unit for a cutting device includes a rotary cutting tool, an electric motor capable of rotatably driving the rotary tool, a gear train capable of transmitting rotation of the electric motor to the cutting tool and reducing a rotational speed of the electric motor in plural stages. The cutting unit further includes a gear chamber capable of accommodating the gear train and a partitioning member capable of partitioning the gear chamber at a midpoint of a transmission path of rotation of the gear train.

Therefore, lubricant, such as grease, contained in the gear chamber can be prevented from flowing out of each of spaces of the gear chamber partitioned by the partitioning member. Therefore, it is possible to lubricate within the entire gear chamber. In particular, in the case that the electric motor is positioned on the upper side within the gear chamber, lubricant may tend to flow downward. However, by partitioning the gear chamber into an upper space and a lower space, it is possible to prevent the lubricant from flowing from the upper space into the lower space, and therefore, insufficient lubrication may not be caused.

Two or more partitioning members may be provided for partitioning the gear chamber into three or more spaces.

The cutting unit may further include a spindle having the cutting tool mounted thereto, an intermediate shaft positioned between the electric motor and the spindle, a drive gear mounted to a motor shaft of the electric motor, and a driven gear and an intermediate gear rotatable with the intermediate shaft. The driven gear engages the drive gear. The partitioning member may be positioned between the driven gear and the intermediate gear. With this arrangement, it is possible to effectively lubricate the drive gear of the electric motor and the driven gear engaging the drive gear and to lubricate a region around these gears.

The spindle may be positioned on the lower side of the electric motor. The rotary cutting tool may be mounted to the spindle. The gear train may include a plurality of reduction gears arranged in a vertical direction between the electric motor and the spindle. The partitioning member may divide the gear chamber into a first chamber on the side of the motor and a second chamber on the side of the spindle. With this arrangement, lubricant contained within the first chamber may be prevented from flowing down into the second chamber.

The intermediate shaft may be positioned parallel to the spindle. The drive gear may be a first bevel gear rotatable with the motor shaft of the electric motor and the driven gear may be a second bevel gear rotatable with the intermediate shaft and engaging with the first bevel gear. The electric motor may have a front portion and a rear portion. The front portion may have the motor shaft. The electric motor may be inclined relative to the intermediate shaft, so that the rear portion of the motor is positioned upward of the front portion. With this arrangement, it is possible to set a cutting depth of the rotary tool to have a large value and to perform an inclined cutting operation with the cutting unit inclined by a large angle toward the side of the electric motor.

An embodiment of the present invention will now be described with reference to FIGS. 1 to 5. Referring to FIG. 1, a cutting device 1 incorporating a cutting unit 10 according to the embodiment is shown. In this embodiment, the cutting device 1 is configured as a slide-type table circular saw. In order to operate the cutting device 1, an operator may be positioned on a front side of the cutting device 1 (the right side of the sheet showing FIG. 1). In this specification, the terms "front side", "rear side", "right side" and "left side" are used to mean the sides as viewed from the side of the operator who is positioned for operating the cutting device 1.

The cutting device 1 generally includes a table 2 for placing thereon a workpiece W1 (or W2), a base 3 supporting the table 2 such that the table 2 can rotate relative to the base 3 within a horizontal plane, and a cutting unit support mechanism 5 for supporting the cutting unit 10 on the upper side of the table 2. The table 2 is rotatable within a horizontal plane about a support shaft 4 mounted to the base 3. A positioning mechanism 6 is disposed on a front portion of the table 2 and is operable to position and fix the table 2 at a desired rotational position.

A positioning fence 7 extends over the upper surface of the table 2 and can position the workpiece W1 (or W2) with respect to a direction parallel to the surface of the table 2. The positioning fence 7 has opposite ends supported on the base 3 and extends in right and left directions over the upper surface of the table 2. The lower surface of the positioning fence 7 is space from the table 2 by a small distance in order to permit rotation of the table 2 relative to the fence 7.

The workpiece W1 shown in the drawings extends vertically upward along positioning surfaces 7a of the fence 7. The workpiece W2 is a so-called crown mold workpiece and is positioned to lean against the positioning surfaces 7a of the fence 7 such that the workpiece W2 is inclined relative to a vertical direction and extends between the positioning surfaces 7a of the fence 7 and the upper surface of the table 2.

Figure 2:
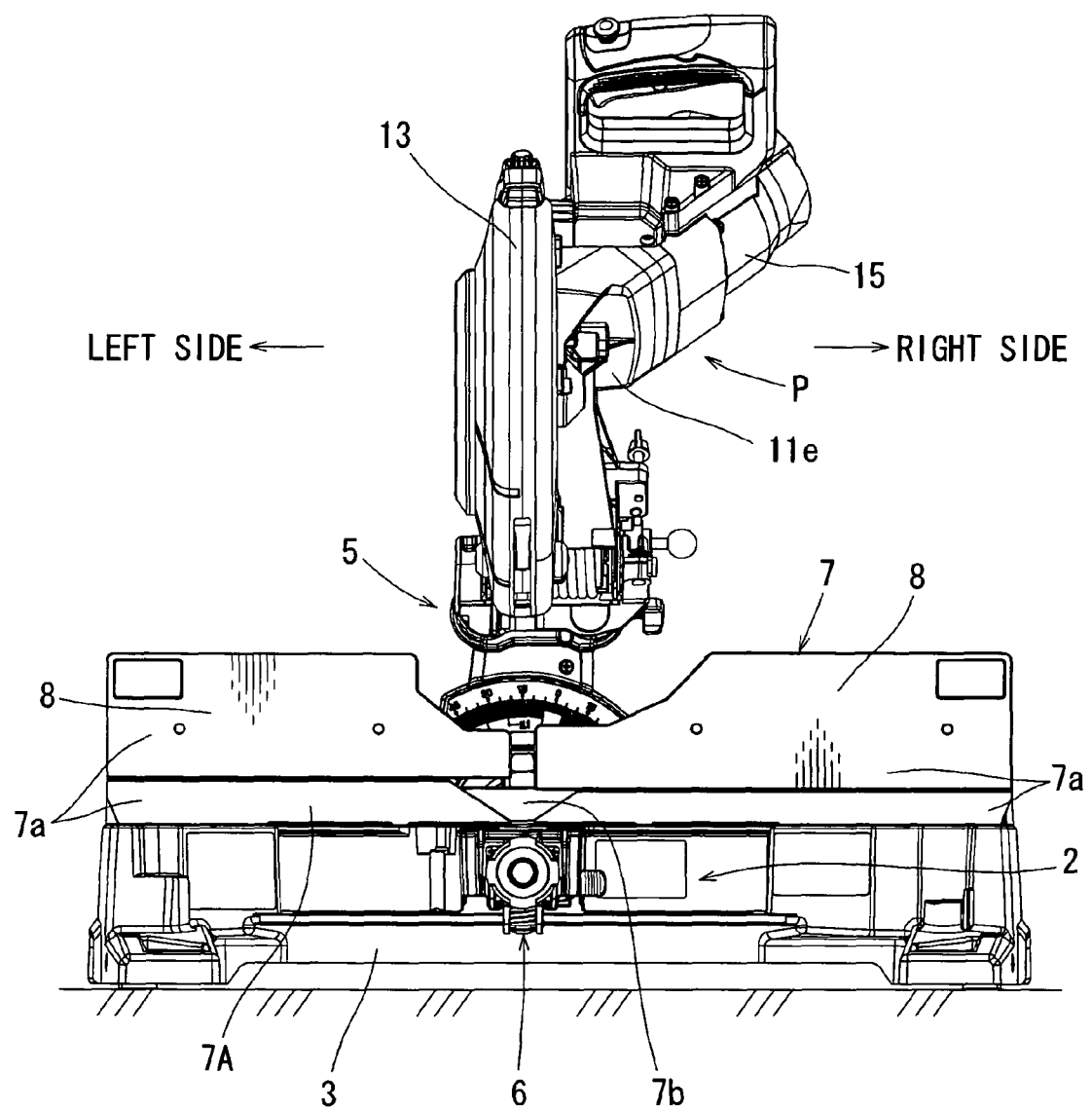
FIG. 2 is a view as viewed in a direction indicated by an arrow (II) in FIG. 1 and showing a front view as viewed from the side of an operator who is positioned for operating the table cutting device.

In this embodiment, four positioning surfaces 7a are defined on the front side (i.e., on the side of the operator) of the positioning fence 7. As shown in FIG. 2, the positioning fence 7 includes a pair of first fence members 7A and a pair of second fence members 8. Two of the positioning surfaces 7a are defined by the first fence members 7A and the remaining two of the positioning surfaces 7a are defined by the second fence members 8. The first fence members 7A are separated from each other to define a slot allowing passage of a rotary tool 12 of the cutting unit 10 and are joined together by an arc-shaped joint portion 7b positioned on the back side of the fence 7. The rotary tool 12 may be a rotary cutting blade or a rotary saw blade.

As shown in FIG. 1, the positioning surfaces 7a extend along a vertical plane that passes through an axis of the support shaft 4 (i.e., the center of rotation of the table 2). Therefore, the plane of the positioning surfaces 7a always passes through the rotational center of the table 2 irrespective of change of the rotational position of the table 2.

The second fence members 8 are movably attached to the upper portions of the first fence members 7A, respectively, so that the positions of the second fence members 8 can be changed in right and left directions as viewed in FIG. 2 relative to the first fence members 7A in order to avoid interference with the cutting unit 10 during a cutting operation with the cutting unit 10 tilted laterally as will be explained later. Fixing devices (not shown) are provided for fixing the second fence members 8 in position relative to the respective first fence members 7A.

The cutting unit support mechanism 5 is disposed on the rear portion of the table 2. The cutting unit support mechanism 5 supports the cutting unit 10 such that (1) the cutting unit 10 can slide in a horizontal direction parallel to the surface of the table 2 (front and rear directions as viewed from the side of the operator), (2) the cutting unit 10 can tilt laterally in right and left directions (the direction perpendicular to the sheet of FIG. 1) and (3) the cutting unit 10 can tilt vertically relative to the table 2. More specifically, the cutting support mechanism 5 includes a lower slide mechanism 5a, a laterally tilting mechanism 5b, an upper slide mechanism 3c and a vertically tilting mechanism 5d.

The lower slide mechanism 5a includes a pair of right and left parallel slide bars that are horizontally slidably supported by a lower portion of the table 2. The laterally tilting mechanism 5b is mounted to and between the rear ends of the slide bars of the lower slide mechanism 5a. The laterally tilting mechanism 5b allows the tool unit 10 to tilt in right or left direction from a vertical position, so that an inclined cutting operation can be preformed with the cutting tool 12 of the tool unit 10 tilted laterally from the vertical position. By fixing the laterally tilting mechanism 5b at a vertical cutting position, in which the cutting tool 12 extends vertically, it is possible to perform a vertical cutting operation.

The upper slide mechanism 5c is mounted to the upper portion of the laterally tilting mechanism 5b and includes a pair of right and left parallel slide bars that can slide relative to the laterally tilting mechanism 5b in a direction parallel to the sliding direction of the lower slide mechanism 5a.

Figure 3:
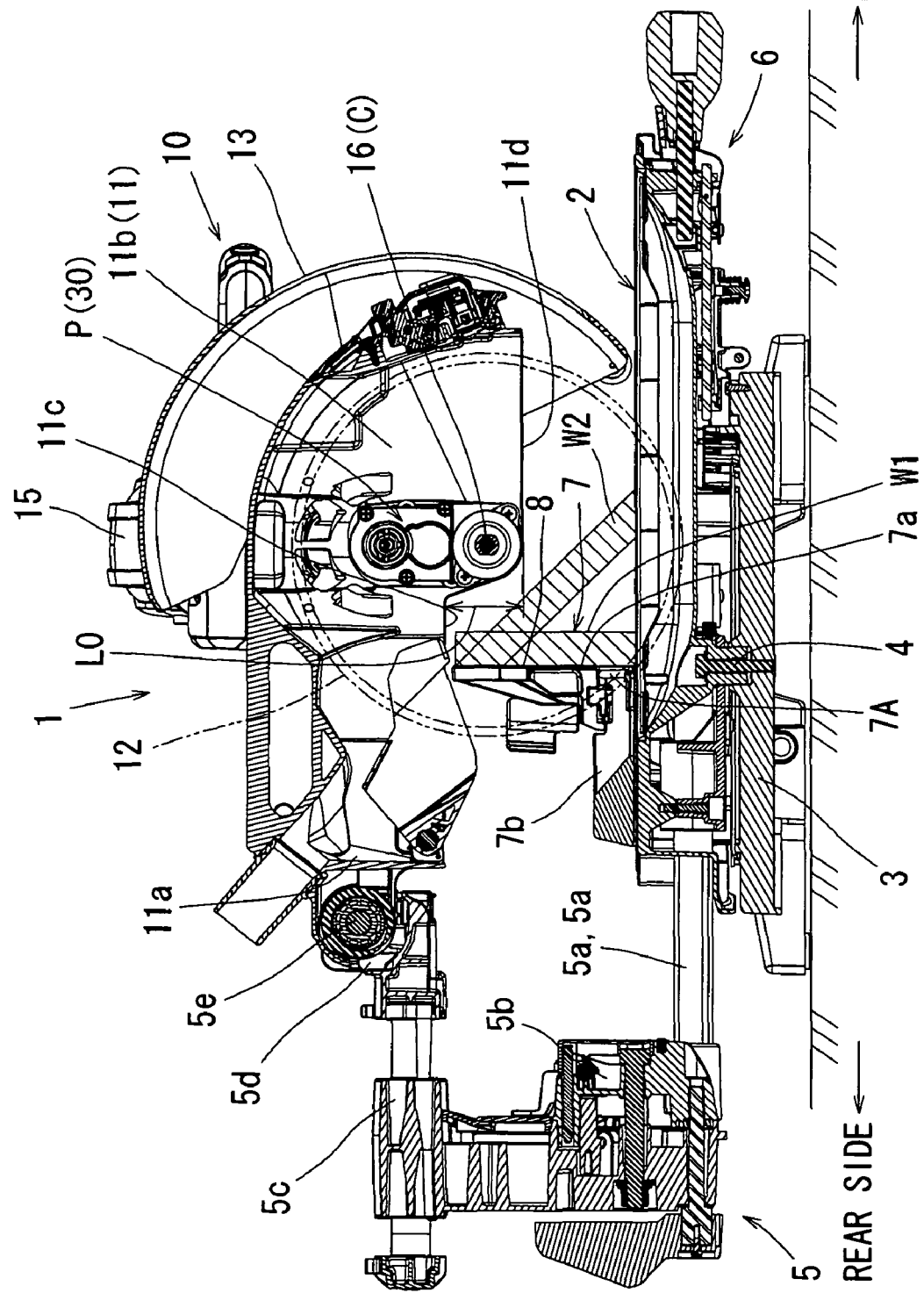
FIG. 3 is a vertical sectional view as viewed from a left side view of the table cutting device and showing a drive system.

The vertically tilting mechanism 5d is mounted to the front portion of the upper slide mechanism 5c and has a pivot shaft 5e that vertically pivotally supports the cutting unit 10. More specifically, the cutting unit 10 has a unit case 11 having a support arm 11a vertically pivotally coupled to the pivot shaft 5e. The unit case 11 also has a stationary cover 11b that can cover substantially the upper half of the cutting tool 12 as shown in FIG. 3.

The cutting unit 10 further includes a movable cover 13 for covering substantially the lower half of the cutting tool 12. The movable cover 13 is pivotally supported by the stationary cover 11b via a support shaft 13a, so that the movable cover 13 can pivot vertically relative to the stationary cover 11b in order to cover and uncover the lower half of the cutting tool 12. The movable cover 13 is coupled to the vertically tilting mechanism 5d, so that (a) as the cutting unit 10 tilts downward, the movable cover 13 pivots in a counterclockwise direction as viewed in FIG. 1 so as to be opened and (b) as the cutting unit 10 tilts upward, the movable cover 13 pivots in a clockwise direction so as to be closed. In the state shown in FIG. 1, the cutting unit 10 is positioned at its uppermost position and the movable cover 13 is substantially completely closed. On the other hand, in the state shown in FIG. 3, the movable cover 13 is opened to uncover the lower half of the cutting tool 12, so that the exposed lower half of the cutting tool 12 can cut into the workpiece W1 (or W2). As the cutting unit 10 tilts upward from the position shown in FIG. 3, the movable cover 13 pivots to uncover the cutting tool 12 and returns to the position shown in FIG. 1, where the cutting tool 12 is substantially completely covered by the stationary cover 11b and the movable cover 13.

An electric motor 15 serving as a drive source of the cutting tool 12 is mounted to the backside (right side in FIG. 2) of the stationary cover 11b. More specifically, the electric motor 15 is mounted to the backside of the stationary cover 11b in such a manner that a motor shaft 15a of the electric motor 15 is oriented downward (the rear side of the electric motor 15 is oriented upward) and the rotational axis of the motor shaft 15a is inclined by an angle of 45° relative to a spindle 16 (that extends horizontally when the tool unit 10 is positioned at the vertical position). The rotation of the electric motor 15 is transmitted to the spindle 16, to which the cutting tool 12 is mounted, via a gear train 30 serving as a torque transmitting mechanism. In this embodiment, the cutting tool 12 has a circular shape about the axis of the spindle 16, so that the rotational axis of the spindle 16 coincides with a rotational axis C of the cutting tool 12.

Figure 4:
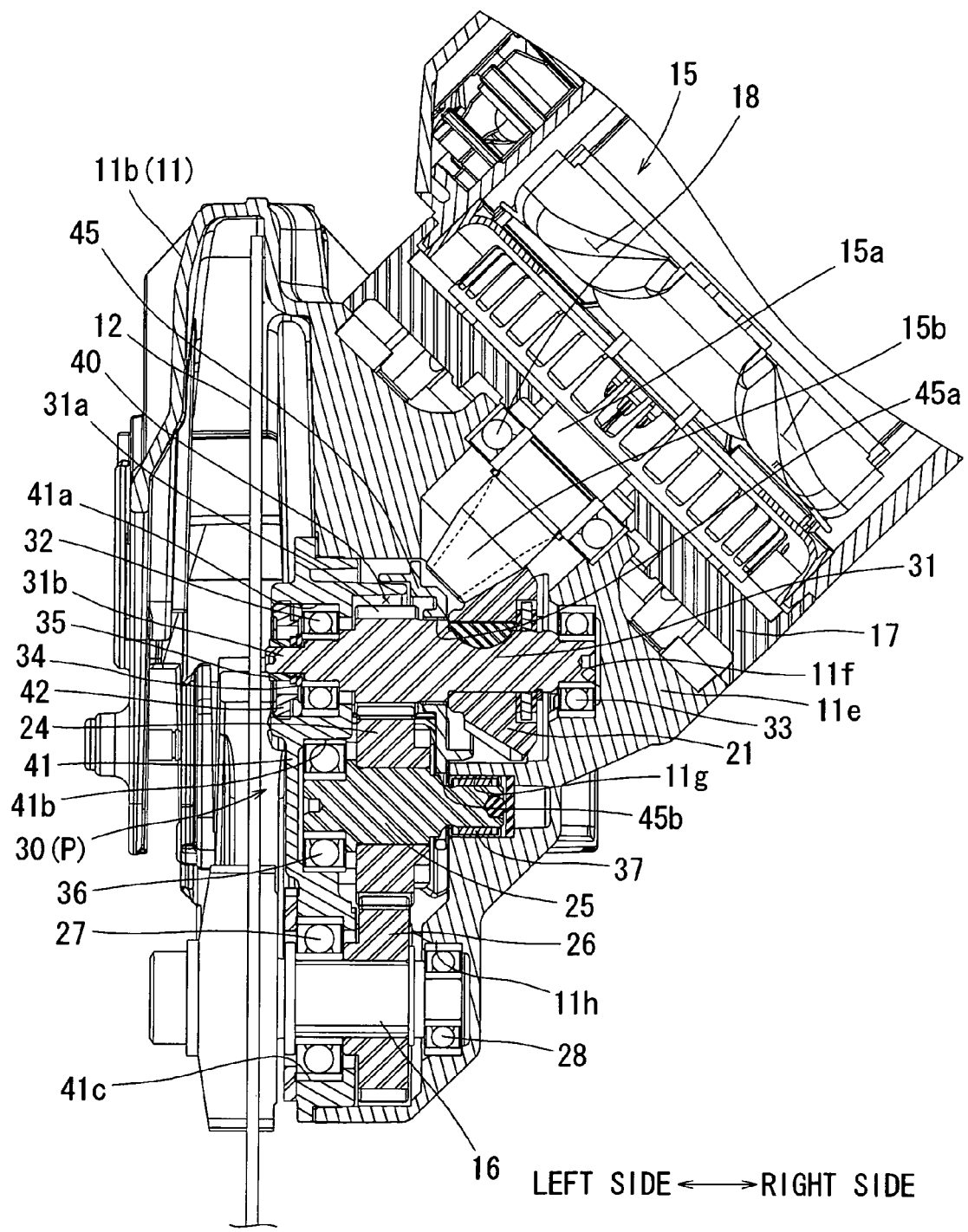
FIG. 4 is an enlarged vertical sectional view of the drive system.
Figure 5:
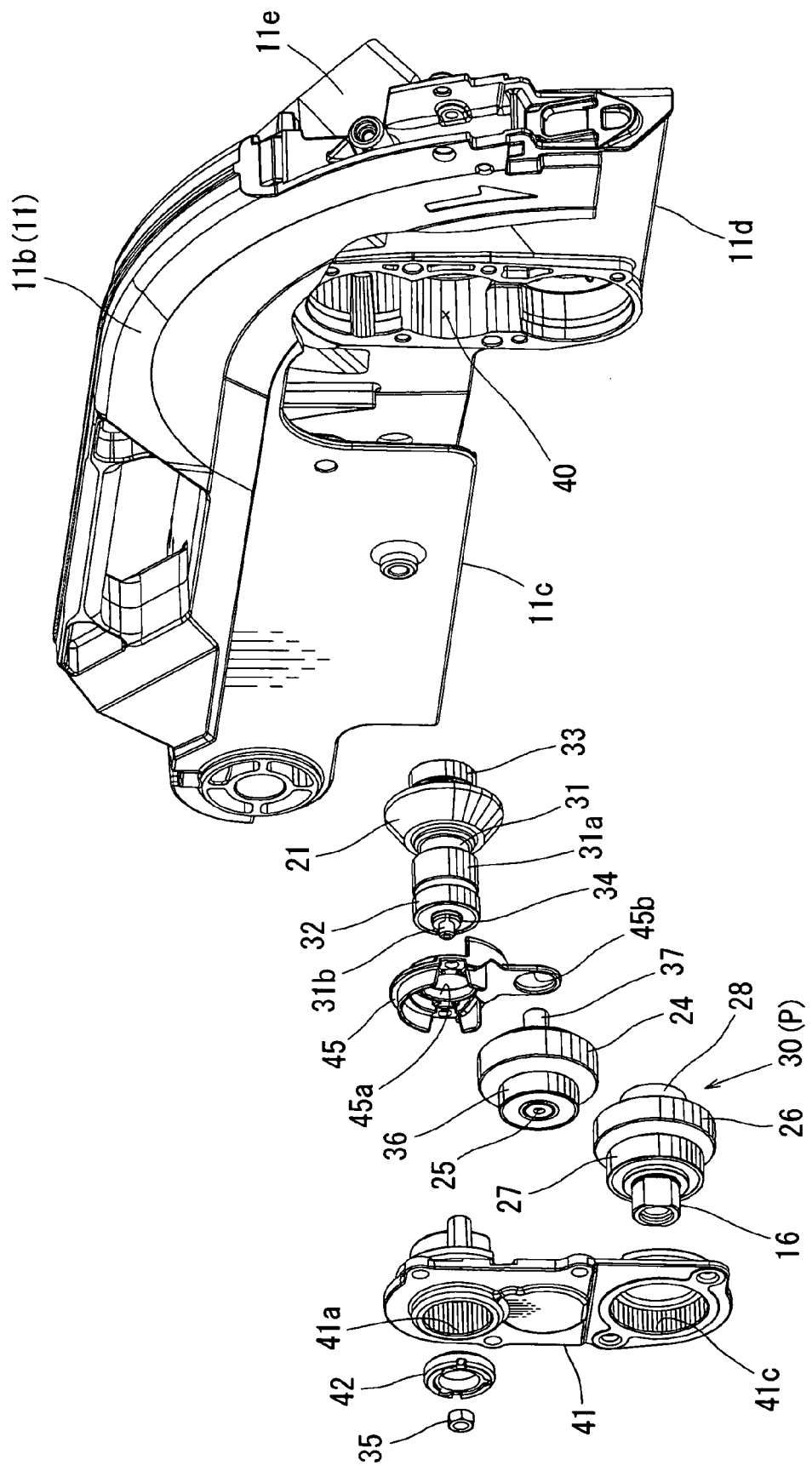
FIG. 5 is an exploded perspective view of the drive system.

A drive system P including the gear train 30 is shown in detail in FIGS. 4 and 5. As shown in FIGS. 4 and 5, a motor base 11e is formed integrally with the backside portion (right side portion) of the stationary cover 11b. The electric motor 15 is mounted to the motor base 11e via a motor bracket 17.

The motor shaft 15a of the electric motor 15 is rotatably supported by the motor base 11e via a bearing 18 and has an end portion protruding into a gear chamber 40 defined within the motor base 11e of the stationary cover 11b. More specifically, the gear chamber 40 is defined by a recessed portion formed in the motor base 11e of the stationary cover 11b and a gear chamber cover 41 attached to the motor base 11e of the stationary cover 11b for closing an open end (left end in FIG. 4) of the recessed portion. In other words, the stationary cover 11b (more specifically, the motor base 11e) and the gear chamber cover 31 serve as a gear housing defining the gear chamber 40 therein. The gear train 30 is accommodated within the gear chamber 40. The gear train 30 serves to transmit rotation of the electric motor 15 to the spindle 16 and to reduce the rotational speed of the electric motor 15 in plural steps.

A drive gear 15b is formed with the motor shaft 15a of the electric motor 15. In this embodiment, the drive gear 15b is a bevel gear having engaging teeth formed on a conical surface, in particular a spiral bevel gear having engaging teeth twisted and curved along a conical surface. The drive gear 15b engages a driven gear 21 that is also configured as a spiral bevel gear corresponding to the driver gear 15b. The driven gear 21 is fixed to a right side portion of a first intermediate shaft 31. A first intermediate gear 31a is formed integrally with a left side portion of the first intermediate shaft 31. In this embodiment, a helical gear is used for the first intermediate gear 31a.

The first intermediate shaft 31 is rotatably supported within the gear chamber 40 via left and right bearings 32 and 33. In this embodiment, a ball bearing having an inner race and an outer race is used as each of the left and right bearings 32 and 33. The left bearing 32 is fitted into a recess 41a that is formed in the gear chamber cover 41 and has a left side open to the outside (i.e., the outside of the gear chamber 40). The first intermediate shaft 31 has a left end portion protruding outwardly through the bearing 32 and formed with a threaded shaft portion 31b. A fixing nut 35 is engaged with the threaded shaft portion 31b and is tightened with a washer 34 interleaved between the nut 35 and the inner race of the bearing 32, so that the inner race of the bearing 32 is clamped between the washer 34 and a left side stepped portion formed on the first intermediate shaft 31. Hence, the bearing 32 is fixed in position relative to the first intermediate shaft 31.

The outer race of the bearing 32 is in contact with a bottom surface of the recess 41a. A bearing nut 42 is engaged with a threaded inner circumferential surface of the recess 41a and is tightened to clamp the outer race of the bearing 32 against the bottom surface of the recess 41a. Hence, the bearing 32 is fixed in position relative to the gear chamber cover 41. As a result, the first intermediate shaft 31 is fixed in position relative to the gear chamber cover 41 not to move in the axial direction relative thereto.

The right-bearing 33 is fitted into a recess 11f formed in the right side portion (on the side of the motor base 11e) of the gear chamber 40. The outer race of the bearing 33 is in contact with a bottom surface of the recess 11f. The inner race of the bearing 33 is in contact with a right side stepped portion formed on the first intermediate shaft 31. Therefore, the first intermediate shaft 31 is reliably prevented from moving in the right direction, while it is permitted to rotate. This may resist against an axial thrust force in the right direction, which may be applied to the first intermediate shaft 31 due to engagement between the drive gear 15b of the motor 15 and the driven gear 21. In this way, the first intermediate shaft 31 is prevented from moving in a direction of application of the thrust force, and the thrust force is received by the motor base 11e.

The first intermediate gear 31a is in engagement with a second intermediate gear 24 that is secured to a second intermediate shaft 25. The second intermediate shaft 25 extends parallel to the first intermediate shaft 31 and is rotatably supported within the gear chamber 40 via left and right bearings 36 and 37. In this embodiment, a ball bearing having an inner race and an outer race is used as the bearing 36. The left bearing 36 is fitted into a recess 41b formed in the gear chamber cover 41 and having a right side open into the gear chamber 40. A needle bearing is used as the right bearing 37 for permitting axial movement of the second intermediate shaft 25. The right bearing 37 is fitted into a recess 11g positioned on the right side of the gear chamber 40 and formed in the motor base 11e.

The second intermediate gear 24 engages an output gear 26 secured to the spindle 16. Therefore, the second intermediate gear 24 engages both of the first intermediate gear 31a and the output gear 26. In this embodiment, the second intermediate gear 24 serves as an idle gear and has no speed reducing function. In other words, the reduction ratio may be equal to that achieved when the first intermediate gear 31a and the output gear 26 directly engage with each other. In this embodiment, a helical gear is used as each of the second intermediate gear 24 and the output gear 26. The spindle 16 is rotatably supported by the gear chamber cover 41 and the motor base 11e via left and right bearings 27 and 28. The left bearing 27 is fitted into a recess 41c formed in the gear chamber cover 41 and having a left side open to the outside. The right bearing 28 is fitted into a recess 11h formed in the motor base 11e and having a left side open into the gear chamber 40. The spindle 16 extends from the gear chamber 40 into the stationary cover 11b through the left bearing 27. The rotary cutting tool 12 is mounted to a portion of the spindle 16 protruding inside of the stationary cover 11b.

In order to lubricate the gear train 30, grease or lubrication oil (not shown) is sealingly contained within the gear chamber 40 defined between the motor base 11e and the gear chamber cover 41. The gear chamber 40 is divided into a right side (drive side) chamber and a left side (driven side) chamber by a partitioning member 45 configured as a wall. Upper and lower insertion holes 45a and 45b are formed in the partitioning member 45. The first intermediate shaft 31 is inserted into the upper insertion hole 45a. The driven gear 21 is positioned on the right side (drive side) of the partitioning member 45, while the first intermediate gear 31a is positioned on the left side (driven side) of the partitioning member 45. Thus, the partitioning member 45 divides the gear chamber 40 into two different sides with respect to the rotation transmission path between the driven gear 21 and the first intermediate gear 31a. The right side portion of the second intermediate shaft 25 is inserted into the lower insertion hole 45b. The partitioning member 45 serves to prevent the grease from flowing from the drive side to the driven side of the gear chamber 40. Thus, the grease for lubricating the drive gear 15b and the driven gear 21 is prevented from flowing downwardly into the lower side of the gear chamber 40 (the side of the spindle 16) by the partitioning member 45. Therefore, it is possible to properly maintain the lubrication of the drive gear 15b and the driven gear 21. The circumferential edge of the partitioning member 45 sealingly contacts the inner wall of the gear chamber 40, more specifically, the inner wall of the base 11e defining the gear chamber 40. In addition, the partitioning member 45 sealingly contacts the first and second intermediate shafts 31 and 25 at the insertion holes 45a and 45b, respectively.

In particular, in the case of this embodiment, because spiral bevel gears are used as the drive gear 15b and the driven gear 21 engaging the drive gear 15b, the lubricant (grease) may tend to be raked at a point within the gear chamber 40 as the drive gear 15b and the driven gear 21 rotate. However, in the above embodiment, the gear chamber 40 is divided into the side of the spiral bevel gears (the side of the drive gear 15b and the driven gear 21) and the side of the helical gears (the side of the first and second intermediate gears 31a and 24 and the output gear 26) by the partitioning member 45, and therefore, the grease is prevented from flowing from the side of the spiral bevel gears to the side of the helical gears. Therefore, it is possible to reliably maintain a suitable amount of grease required for lubricating the side of the spiral bevel gears. As a result, the durability of the spiral gears can be improved and generation of gear meshing sounds can be inhibited.

In this embodiment, when the electric motor 15 is driven, the cutting tool 12 rotates in a clockwise direction as viewed in FIG. 3. The spindle 16 is supported by a spindle support portion of the stationary cover 11b, which is positioned at a lower end of the stationary cover 11b. A portion of the stationary cover 11b on the rear side of the spindle support portion is recessed upward and has a lower edge 11c that is positioned at a higher level than a lower edge 11d of the stationary cover 11b including the spindle support portion positioned on the front side. As shown in FIG. 3, the lower edge 11c is positioned at a higher level than the lower edge 11d by a distance L0. When the cutting unit 10 is at a lowermost position shown in FIG. 3, the positioning fence 7 including the second fence members 8 attached to the first fence members 7A is positioned below the lower edge 11c and does not contact with the lower edge 11c. Thus, in this embodiment, the rear portion of the stationary cover 11b having the lower edge 11c is recessed upward by the distance L0. Therefore, when the tool unit 10 has moved to its lowermost position, the lower edge 11c does not interfere with the positioning fence 7 even in the case that the second fence members 8 are attached to the first fence members 7A to increase a height of the positioning fence 7.

According to the embodiment described above, the gear chamber 40 accommodating the gear train 30 of the drive system P is separated into a spiral bevel gear side and a helical gear side by the partitioning member 45 positioned between the driven gear 21 and the first intermediate gear 31a of the first intermediate shaft 31. Therefore, it is possible to prevent grease contained within the spiral bevel gear side of the gear chamber 40 from flowing into the helical gear side by the partitioning member 45. Hence, it is possible to ensure that the drive gear 15b and the driven gear 21 are always reliably lubricated by the grease. As a result, it is possible to inhibit generation of heat and meshing sounds of these gears, and consequently, it is possible to improve the durability of the drive gear 15b and the driven gear 21.

In addition, the driven gear 21 engaging the drive gear 15a of the electric motor 15 is secured to the first intermediate shaft 31 that cannot move in the axial direction but can rotate about its axis. A thrust load (impact) may be repeatedly applied to the driven gear 21 as the electric motor 15 is repeatedly started and stopped. However, this load can be received by the motor base 11e, and therefore, it is possible to reliably properly maintain the position of the driven gear 21 and to eventually inhibit generation of gear meshing sounds. It is also possible to improve the durability of the drive gear 21 and the driven gear 15a.

Further, according to the above embodiment, the rotation of the electric motor 15 is transmitted to the spindle 16 via three pairs of meshing gears. Therefore, it is possible to ensure a large distance between the motor shaft 15a of the electric motor 15 and the spindle 16. This arrangement allows the lower end 11c of the rear portion of the stationary cover 11b to be recessed by a large distance. In other words, it is possible to set the distance L0 to have a large value. Therefore, the positioning fence 7 is allowed to increase its height by increasing the height of the first fence members 7A or the height of the second fence members 8. As a result, a workpiece, such as the workpiece W2 that is a crown mold material having a large width, can be accurately cut by leaning the workpiece against the positioning fence 7.

Furthermore, the electric motor 15 is mounted to the motor base 11e of the stationary cover 11b via the motor bracket 17 such that the motor shaft 15a is inclined downwardly while the motor shaft 15a is positioned on the lower side of the electric motor 15. Therefore, it is possible to perform an inclined cutting operation with the cutting unit 10 inclined rightwardly by a large angle.

The above drive system P may be applied to any other drive systems other than that of the cutting unit 10 of the table cutting device 1 described above. For example, the above drive system P can be incorporated as a drive system of a portable cutting tool. Although illustration is omitted, a portable cutting tool may include a base adapted to be placed on a workpiece, and a cutting unit supported on an upper side of the base. The cutting unit has a rotary cutting blade having a lower portion protruding downward from the base, so that the rotary cutting blade can cut the workpiece as the base and the cutting unit move together along the upper surface of the workpiece. For example, by positioning an electric motor of a drive system of the cutting unit to be inclined downwardly and configuring a reduction gear train of the drive system to have a plurality of reduction stages, it is possible to ensure a large cutting depth and to ensure a large inclination angle of the cutting unit for an inclined cutting operation.

Furthermore, although the partitioning member 45 is prepared separately and assembled within the gear chamber 40 in the above embodiment, the partitioning member 45 may be formed integrally with the motor base 11e or the gear chamber cover 41. The fastening structure of the fixing nut 35 tightened against the threaded shaft portion 31b for fixing the first intermediate shaft 31 not to move in the axial direction can be eliminated. This may allow the first intermediate shaft 31, the second intermediate shaft 25 and the spindle 16 to be assembled at one time with the motor base 11e.

Furthermore, although helical gears are used as the first intermediate gear 31a, the second intermediate gear 24 and the output gear 26 in the above embodiment, spur gears can be used as these gears.

This invention claims:

1. A cutting unit for a cutting device, comprising:
a rotary cutting tool;
an electric motor capable of rotatably driving the rotary cutting tool;
a gear train capable of transmitting rotation of the electric motor to the rotary cutting tool and reducing a rotational speed of the electric motor in plural stages;
a gear chamber capable of accommodating the gear train therein;
a partitioning member capable of partitioning the gear chamber at a midpoint of a transmission path of rotation of the gear train;
a spindle having the cutting tool mounted thereto;
an intermediate shaft positioned between the electric motor and the spindle;
a drive gear rotatable with a motor shaft of the electric motor; and
a driven gear and an intermediate gear rotatable with the intermediate shaft, the driven gear being engaging with the drive gear,
wherein the partitioning member is positioned between the driven gear and the intermediate gear;
the intermediate shaft has a first end on a side of the driven gear and has a second end on a side of the intermediate gear, and
the first and second ends of the intermediate shaft are rotatably supported by a motor base and a gear chamber cover, respectively.

2. The cutting unit as in claim 1, wherein:
the spindle is positioned on a lower side of the electric motor, and
the partitioning member partitions the gear chamber into a first chamber on a side of the motor and a second chamber on a side of the spindle.

3. The cutting unit as in claim 2, wherein:
the intermediate shaft is positioned parallel to the spindle,
each of the drive gear and the driven gear is a bevel gear, and
the electric motor has a front portion including the motor shaft and a rear portion opposite to the front portion and is inclined relative to the intermediate shaft, so that the rear portion of the electric motor is positioned upward of the front portion.

4. The cutting unit as in claim 3, wherein each of the drive gear and the driven gear is a spiral bevel gear.

5. The cutting unit as in claim 3, wherein the gear train further includes an output gear rotatable with the spindle and engaging with the intermediate gear, and each of the intermediate gear and the output gear is a helical gear or a spur gear.

6. The cutting unit as in claim 1, wherein the gear chamber contains lubricant therein, and the partitioning member can prevent the lubricant from flowing from the side of the driven gear toward the side of the intermediate gear.

7. The cutting unit as in claim 6, wherein the partitioning member is a separate member from the motor base and the gear chamber cover.

8. The cutting unit as in claim 1, wherein:
the gear chamber is defined between the motor base and the gear chamber cover attached to the motor base,
the electric motor is mounted on the motor base, and
the intermediate shaft is prevented from moving toward the motor base.

9. A drive system for a power tool, comprising:
a gear housing having a gear chamber defined therein;
an electric motor mounted to the gear housing and having a motor shaft, the motor shaft extending into the gear chamber and having a first gear positioned within the gear chamber;
a first shaft rotatably supported by the gear housing and having a second gear and a third gear positioned within the gear chamber;
a second shaft rotatably supported by the gear housing and having a fourth gear engaging the third gear of the first shaft; and
a partitioning member positioned within the gear chamber and partitioning the gear chamber into a first space and a second space,
wherein the second gear engages the first gear of the motor shaft of the electric motor,
the first and second gears are positioned within the first space,
the third and fourth gears are positioned within the second space,
the first shaft has a first end on a side of the second gear and has a second end on a side of the third gear, and
the first and second ends of the first shaft are rotatably supported by a motor base and a gear chamber cover, respectively.

10. The drive system as in claim 9, wherein the partitioning member has an insertion hole through which the first shaft extends.

11. The drive system as in claim 10, wherein the partitioning member has a circumferential edge substantially sealingly contacting with an inner wall of the gear chamber.

12. The drive system as in claim 9, wherein:
the motor shaft of the motor is positioned on the upper side of the first shaft and is inclined relative to the first shaft to extend downwardly toward the first shaft, and
the second shaft extends parallel to the first shaft and is positioned on the lower side of the first shaft.

13. The drive system as in claim 12, further comprising a third shaft rotatably supported by the gear housing, wherein the third shaft is positioned between the first shaft and the second shaft and extends parallel to the first and second shaft, and the third shaft has a fifth gear engaging with both of the third gear and the fourth gear.

14. A cutting unit for a cutting device, comprising:
a rotary cutting tool;
an electric motor capable of rotatably driving the rotary cutting tool;
a gear train capable of transmitting rotation of the electric motor to the rotary cutting tool and reducing a rotational speed of the electric motor in plural stages;
a gear chamber capable of accommodating the gear train therein;
a partitioning member capable of partitioning the gear chamber at a midpoint of a transmission path of rotation of the gear train;
a spindle positioned on a lower side of the electric motor; and
an intermediate shaft positioned parallel to the spindle,
wherein the spindle is positioned on a lower side of the electric motor, the partitioning member partitions the gear chamber into a first chamber on a side of the motor and a second chamber on a side of the spindle, the intermediate shaft is positioned parallel to the spindle, each of the drive gear and the driven gear is a bevel gear, and the electric motor has a front portion including the motor shaft and a rear portion opposite to the front portion and is inclined relative to the intermediate shaft, so that the rear portion of the electric motor is positioned upward of the front portion.

15. A cutting unit for a cutting device, comprising:

a rotary cutting tool;

an electric motor capable of rotatably driving the rotary cutting tool;

a gear train capable of transmitting rotation of the electric motor to the rotary cutting tool and reducing a rotational speed of the electric motor in plural stages;

a gear chamber capable of accommodating the gear train therein;

a partitioning member capable of partitioning the gear chamber at a midpoint of a transmission path of rotation of the gear train;

a spindle having the cutting tool mounted thereto;

an intermediate shaft positioned between the electric motor and the spindle;

a drive gear rotatable with a motor shaft of the electric motor; and a driven gear and an intermediate gear rotatable with the intermediate shaft, the driven gear being engaging with the drive gear;

wherein the partitioning member is positioned between the driven gear and the intermediate gear, the gear chamber is defined between a motor base and a gear chamber cover attached to the motor base, the electric motor is mounted on the motor base, and the intermediate shaft is prevented from moving toward the motor base.

16. A drive system for a power tool, comprising:

a gear housing having a gear chamber defined therein;

an electric motor mounted to the gear housing and having a motor shaft, the motor shaft extending into the gear chamber and having a first gear positioned within the gear chamber;

a first shaft rotatably supported by the gear housing and having a second gear and a third gear positioned within the gear chamber;

a second shaft rotatably supported by the gear housing and having a fourth gear engaging the third gear of the first shaft; and a partitioning member positioned within the gear chamber and partitioning the gear chamber into a first space and a second space, wherein the second gear engages the first gear of the motor shaft of the electric motor, the first and second gears are positioned within the first space, the third and fourth gears are positioned within the second space, the motor shaft of the motor is positioned on the upper side of the first shaft and is inclined relative to the first shaft to extend downwardly toward the first shaft, and the second shaft extends parallel to the first shaft and is positioned on the lower side of the first shaft.

* * * * *